United States Patent [19]

Castiaux

[11] 4,093,126
[45] June 6, 1978

[54] PULVERIZER

[76] Inventor: Marcel A. Castiaux, rue de Gosselies 58, Roux, Belgium, B-6160

[21] Appl. No.: 786,212

[22] Filed: Apr. 11, 1977

[30] Foreign Application Priority Data

Apr. 16, 1976 Belgium .............................. 0166241

[51] Int. Cl.² ...................... B02C 13/31; B02C 13/286
[52] U.S. Cl. ...................................... 241/37.5; 241/99; 241/186 R
[58] Field of Search ............ 241/37.5, 99, 100, 186 R, 241/186.2

[56] References Cited

U.S. PATENT DOCUMENTS

| 2,899,140 | 8/1959 | Hellyer | 241/100 X |
| 3,655,138 | 4/1972 | Luscombe | 241/99 |
| 3,750,965 | 8/1973 | Madden et al. | 241/99 X |
| 3,841,571 | 10/1974 | Dankel et al. | 241/186 R X |
| 3,889,886 | 6/1975 | Spivey | 241/99 X |
| 3,938,745 | 2/1976 | Gladwin | 241/100 X |

Primary Examiner—Roy Lake
Assistant Examiner—Howard N. Goldberg
Attorney, Agent, or Firm—McGlew and Tuttle

[57] ABSTRACT

A pulverizer is intended, in particular, for pulverizing glass containers. It comprises a barrel closed by a lid at its upper end and having at its base a removable container. A flap is mounted and movable inside the barrel in such a way that, in a closed position, the flap divides the interior of the barrel into a first compartment acting as a filling chamber between the flap and the lid, and a second compartment containing a pulverizing rotor provided with blades. The second compartment thus provides a pulverization chamber between the flap and the removable container.

7 Claims, 3 Drawing Figures

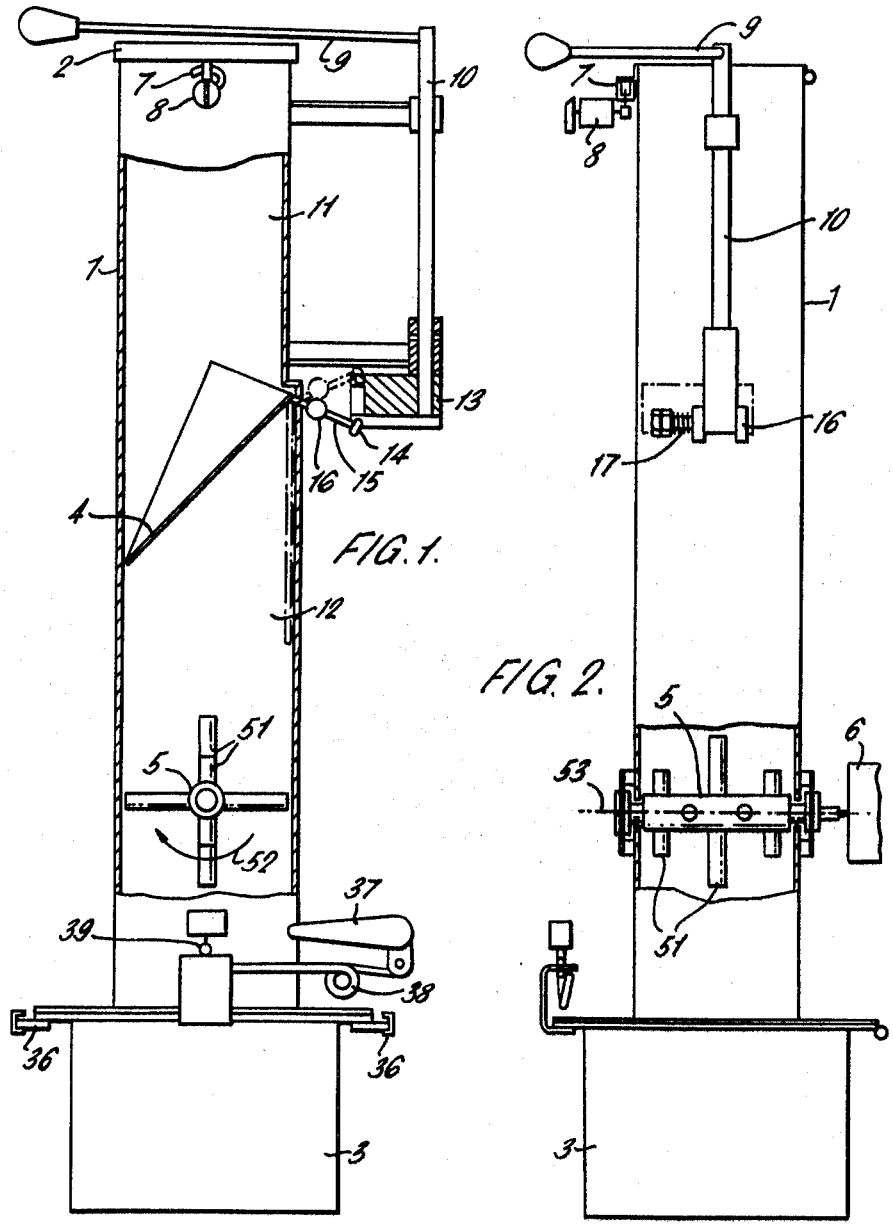
FIG. 1.
FIG. 2.
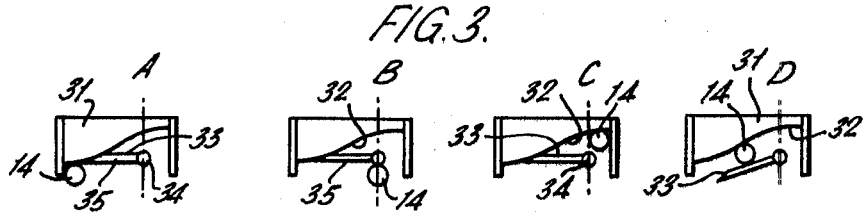
FIG. 3.

PULVERIZER

BACKGROUND OF THE INVENTION a. Field of the Invention

The present invention relates to an apparatus of small dimensions intended for pulverising any sort of articles made of a frangible material, such as glass, porcelain, etc., particularly glass containers such as bottles and flagons.

b. Description of the Prior Art

A pulveriser is known from U.S. Pat. No. 3,756,520, in which a chute, arranged obliquely and closed at its upper part by a rubber screen, allows bottles to be fed towards a pulverising rotor. Such an arrangement is obviously dangerous in that the said screen is not sufficient to retain glass fragments which may be expelled by the rotor, and in addition because no mechanism prevents accidental introduction of a hand of the user into the machine, unless a chute of prohibitive length is provided. Moreover, the location of the rotor in respect to the direction of fall of the articles to be treated is not a satisfactory arrangement.

A device of different conception and comprising a baffle in the feed channel, in regard to which similar criticisms can be formulated, is likewise described in U.S. Pat. No. 3,889,886.

The present invention aims to provide a pulveriser of the type described which is easy and safe to use. The safety objective aims firstly to protect the user and secondly to protect the apparatus against incorrect handling. Protection of the user assumes that he cannot accidentally put his hand or his arm into the pulveriser while it is working and that glass fragments cannot be thrown out during pulverisation. All this must be achievable with an apparatus which carries out in an efficient manner the work expected from it and which is, moreover, compact.

SUMMARY OF THE INVENTION

The apparatus according to the invention answers these requirements. It comprises a barrel closed by a lid at its upper end and having at its base a removable container, a flap placed inside the barrel in such a way that in a closed position it separates the interior of the barrel into a first compartment acting as a filling chamber between the flap and the lid, and a second compartment containing a rotor equipped with blades to act as a pulverising chamber between the flap and the removable container, and a mechanism comprising an arm fitted in such a way that in a first position it locks the lid and in another position frees the lid, this mechanism also comprising means such that in said first position these means allow the flap to be opened and in the said other position they keep the flap closed.

In this way, the safety objective of the device is assured.

According to a particularly advantageous embodiment of the invention, the rotor is mounted on a horizontal shaft in the pulverising chamber and the flap when closed is arranged so as to direct the articles to be treated towards one wall of the pulverising chamber, the direction of rotation of the rotor being such that it displaces upwards the articles freed by the flap and essentially sliding along this wall.

It follows from this that the articles are initially returned upwards, which ensures increased efficiency in the destruction of the articles to be treated.

The said barrel of the pulveriser is of a shape which allows full retraction of the flap in the fully open position.

It is recommended that the rotor should be installed in the pulverising chamber so as to leave a gap of less than 0.7 mm between the ends of the rotor blades and the wall of the pulverising chamber on the operative cutting side of the blade. With a rotor revolving at about 3,000 rpm, this enables a non-cutting product to be obtained which can normally be manipulated with bare hands and of which the particle size allows recycling to glass-making ovens, thus contributing to the protection of the environment.

The apparatus likewise comprises advantageously a device sensitive to the weight of the container and adjusted so as to react when the weight of the container reaches a set limit. A signalling and/or warning device may also be provided which is activated in response to the reaction of the device sensitive to the weight of the container.

Other features of the invention will be apparent from the following description, drawings and claims, the scope of the invention not being limited to the drawings themselves as the drawings are only for the purpose of illustrating a way in which the principles of the invention can be applied. Other embodiments of the invention utilising the same or equivalent principles may be used and structural changes may be made as desired by those skilled in the art without departing from the present invention and the purview of the appended claims.

BRIEF DESCRIPTION OF THE DRAWINGS

FIGS. 1 and 2 are elevation views, partially sectioned on two orthogonal axial planes;

FIG. 3 shows the profile of a cam forming part of a locking mechanism of the embodiment illustrated, with views A to D of this figure illustrating four relative positions of the mechanism.

DESCRIPTION OF THE PREFERRED EMBODIMENT

The apparatus comprises a barrel 1 of any shape but preferably cylindrical, closed by a hermetic lid 2 and placed above a receiving and evacuating container 3. In the interior of the barrel 1 are arranged a filling chamber 11 and a pulverising chamber 12 separated from one another by a movable flap 4. A rotor 5 equipped with blades 51 and driven by an electric motor 6 is mounted at the bottom of the pulverising chamber. The lid 2 is kept locked by a hook or a pin 7 mounted on an interruptor 8 which blocks the lid when the motor 6 is not operating, and by a horizontal arm 9. The latter is part of a mechanism controlling the opening and closing of flap 4. This mechanism comprises a vertical shaft 10 at the lower end of which is mounted a cam 13 interacting with a roller 14 attached to the end of a lever 15 secured to the flap 4 and articulated at the centre so as to pivot about a horizontal axis 16. About this axis is mounted a spring 17 tending to hold the flap 4 in the open position.

The mechanism controlling the flap 4 is arranged in such a way that the flap: (1) is in a closed position (the position shown in FIG. 1) when the lid 2 is not blocked by the arm 9, the flap is closed, thus preventing any glass being thrown out and retaining the charge introduced into the filling chamber 11 while the lid 2 is open; (2) opens and releases the charge when the lid 2 is blocked by arm 9. This mechanism thus ensures perfect safety for the user.

The profile of the cam 13 is shown in FIG. 3. The cam comprises a body 31 contoured to provide a curved rolling track 32 and a catch 33 pivoting about a pin 34. The catch is mounted in such a way that its lower face forms with the lower end of the body a rectilinear rolling track 35, as shown in FIG. 3A. This figure shows the position of the roller 14 when the flap 4 is closed. It will be noted that at this moment arm 9 has disengaged the lid 2, which can then be opened.

To open the flap 4, it is sufficient to make arm 9 pivot in a horizontal plane about the axis of the shaft 10. While the arm 9 is pivoting, the cam 13 is driven by the shaft 10, so that the roller 14 rolls on the rolling track 35 as far as the pin 34 of catch 33 (FIG. 3B). Once having passed beyond the pin 34, the roller 14 is free and, under the action of spring 17 (see FIG. 2) which causes the lever 15 to pivot, the roller 14 quickly passes on to the rolling track 32 (FIG. 3C), the effect of which is to release the flap 4 which then opens and allows the charge in the filling chamber 11 to fall down towards rotor 5 to be pulverised.

While the flap 4 is thus open, the arm 9 blocks the lid 2 and prevents it being opened, thus obviating any accident while the apparatus is functioning.

In order that the lid 2 may be opened, the arm 9 must be pivoted, which necessarily entails closing the flap 4. During this displacement, the roller 14 rolls on the rolling track 32 and lifts catch 33 (see FIG. 3D); accomplishing this, the roller 14 descends and tilts the lever 15 which then brings the flap 4 into its closing position, which it reaches at the end of the run (FIG. 3A). The arm 9 has then disengaged the lid 2, which can thus open to allow the filling chamber 11 to be charged.

The pulverised glass is received in the removable container 3 ready to be disposed of. This container, sealed against projections and fine fragments, may have any shape and be fixed to the barrel 1 of the apparatus by any means whatever. By way of example, in no way limitative, a fixing system is illustrated in FIGS. 1 and 2 which comprises two pins 36, a handle 37 and a calibrated spring 38. The handle 37 keeps the container 3 in the closed position through the intermediary of the spring 38.

The container 3 is advantageously provided with a signalling and/or warning device indicating that the contents of the container 3 have reached a set limit. Such a device may, for instance, consist of a contact 39 arranged so as to open when the weight of container 3 reaches a prescribed value which causes the spring 38 to dip. The opening of contact 39 results in the illumination of a warning light (not shown) and/or the operation of a sound warning device (not shown) and/or cutting off of the current to the electric motor 6. A relay may, however, usefully be provided to allow completion of the pulverising in progress to avoid the rotor being obstructed.

It will be noted that the slope of flap 4 is such that it forms a chute which, when opened, brings about the fall of the articles along the wall of chamber 12 opposite to the axis of articulation 16. The rotor 5, rotating on a horizontal shaft 53 in the direction of arrow 52, will thus displace upwards the articles released by the flap 4.

In the embodiment illustrated the barrel comprises a housing which allows the flap to be fully retracted. This prevents obstruction of the passage and protects the flap from direct impact from the glass undergoing pulverisation.

It is advantageous if the gap from the end of blades 51 to the wall of barrel 1 to the right of these blades, i.e. on the operative cutting side of the blades, is less than 0.7 mm when the rotor is driven at about 3,000 rpm.

I claim:

1. A pulveriser for glass containers, comprising a barrel, a lid closing an upper end of said barrel, a flap mounted in said barrel and movable between a closed position and an open position, said flap dividing the interior of said barrel when in a closed position into a first compartment above said flap defining a filling chamber and a second compartment below said flap defining a pulveriser chamber, a pulverising rotor having blades mounted in said second compartment, and a mechanism comprising an arm moveable between a first position in which it locks said lid and another position in which said arm disengages said lid and comprising a cam integral with said arm, said cam having two rolling tracks, a lever pivotally mounted on said barrel adjacent said flap having one end connected to said flap and an opposite end, and a roller attached to said opposite end of said lever engageable successively on said two rolling tracks of said cam.

2. A pulveriser, in particular for glass containers, comprising a barrel, a lid closing an upper end of the barrel, a removable container at the base of the barrel, a flap mounted in the barrel and movable between a closed position and an open position, in said closed position said flap dividing the interior of said barrel into a first compartment acting as a filling chamber between said flap and said lid and a second compartment between said flap and said container, a pulverising rotor equipped with blades mounted in said second compartment which thus acts as a pulverising chamber, and a mechanism comprising an arm fitted in such a way that in a first position it locks the lid and in another position the arm disengages the lid, this mechanism also comprising means such that in said first position these means allow said flap to be opened and in said other position they keep said flap closed, a cam integral with said arm, said cam being arranged in such a way as to present two rolling tracks, a lever integral with said flap and pivoting in the region of its center about a pivot fixed to said barrel, and a roller attached to one end of said lever, said roller being mounted in such a way as to roll successively on said two rolling tracks of the cam.

3. A pulveriser according to claim 2, wherein the cam comprises a body featuring a curved rolling track providing one of said two rolling tracks and a catch articulated at one end on a pivot integral with the said body of the cam, and having its other end, which rests on a part of the curved rolling track, disposed to form a second rectilinear rolling track providing the other of said two rolling tracks.

4. A pulveriser according to claim 2, wherein the rotor is mounted on a horizontal shaft in the pulverising chamber and the flap is arranged so that, in the closed position, the flap directs the articles to be treated towards one side of the pulverising chamber, the direction of rotation of the rotor being such that it displaces upwards the articles released by the flap and sliding essentially along said one side of the wall of the barrel.

5. A pulveriser according to claim 2, wherein said barrel of the pulveriser has a shape such as to allow complete retraction of the flap in the fully opened position.

6. A pulveriser according to claim 2, wherein said rotor is mounted in the pulverising chamber in such a way as to leave a gap of less than 0.7 mm between the ends of the rotor blades and the wall of the pulverising chamber, on the operative cutting side of the blades.

7. A pulveriser according to claim 6, wherein the rotor is driven at a speed of the order of 3,000 rpm.

* * * * *